(12) United States Patent
Shie et al.

(10) Patent No.: US 11,163,221 B2
(45) Date of Patent: Nov. 2, 2021

(54) PROJECTION DEVICE

(71) Applicant: Coretronic Corporation, Hsin-Chu (TW)

(72) Inventors: Jen-Yu Shie, Hsin-Chu (TW); Kuang-Hsiang Chang, Hsin-Chu (TW); Heng Li, Hsin-Chu (TW); Pei-Cheng Liao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/898,453

(22) Filed: Jun. 11, 2020

(65) Prior Publication Data

US 2020/0393745 A1 Dec. 17, 2020

(30) Foreign Application Priority Data

Jun. 14, 2019 (CN) .......................... 201920892991.7

(51) Int. Cl.
*G03B 21/14* (2006.01)
*F16M 13/02* (2006.01)
*F16M 11/18* (2006.01)
*G03B 21/54* (2006.01)

(52) U.S. Cl.
CPC ........... *G03B 21/145* (2013.01); *F16M 11/18* (2013.01); *F16M 13/027* (2013.01); *G03B 21/142* (2013.01); *G03B 21/54* (2013.01)

(58) Field of Classification Search
None
See application file for complete search history.

(56) References Cited

U.S. PATENT DOCUMENTS

2014/0146296 A1* 5/2014 Tian .................... G03B 21/145
353/101
2017/0277025 A1 9/2017 Kasuga et al.

FOREIGN PATENT DOCUMENTS

TW 200607953 3/2006

* cited by examiner

*Primary Examiner* — Michelle M Iacoletti
*Assistant Examiner* — Danell L Owens
(74) *Attorney, Agent, or Firm* — JCIPRNET

(57) ABSTRACT

The invention provides a projection device which includes a rotating module and an imaging module. The rotating module is assembled on a mounting surface and includes a rotating part and an assembling part which are integrally formed. The rotating part is parallel to the mounting surface, and the assembling part is perpendicular to the mounting surface. The imaging module is assembled on the assembling part of the rotating module. When the rotating module rotates by taking an axis perpendicular to the mounting surface as an axial center, the rotating module drives the imaging module to rotate so as to change a projection direction of the imaging module. The projection device of the invention adjusts the projection direction without using a tool.

22 Claims, 19 Drawing Sheets

PROJECTION DEVICE

CROSS-REFERENCE TO RELATED APPLICATION

This application claims the priority benefit of China application serial no. 201920892991.7, filed on Jun. 14, 2019. The entirety of the above-mentioned patent application is hereby incorporated by reference herein and made a part of this specification.

BACKGROUND

1. Technical Field

The invention relates to an optical device, and particularly relates to a projection device.

2. Description of Related Art

At present, the projection direction of a lens of a projector embedded in a ceiling or attached to a ceiling only can be adjusted by using a tool such as a screw driver or a plurality of indirect adjusting elements, so that the adjusting operation is complicated. Furthermore, in order to contain the indirect adjusting elements in a lens barrel of the projector, the projector cannot be effectively thinned, so that the projector has a larger volume. In addition, if an electric motor or a control circuit is additionally arranged to automatically adjust the projection direction, the cost of the projector is increased, so that the cost requirement cannot be met.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a projection device which can adjust the projection direction without using a tool.

Other objectives and advantages of the invention may be further understood from the technical features disclosed in the invention.

In order to achieve one or a portion or all of the above objectives or other objectives, an embodiment of the invention is directed to a projection device which includes a rotating module and an imaging module. The rotating module is assembled on a mounting surface and includes a rotating part and an assembling part which are integrally formed. The rotating part is parallel to the mounting surface, and the assembling part is perpendicular to the mounting surface. The imaging module is assembled on the assembling part of the rotating module. When the rotating module rotates by taking an axis perpendicular to the mounting surface as an axial center, the rotating module drives the imaging module to rotate so as to change a projection direction of the imaging module.

Based on the above, the embodiment of the invention has at least one of the following advantages or effects. In the design of the projection device of the invention, the rotating module is of an integral design, so that when the rotating module rotates by taking an axis perpendicular to the mounting surface as an axial center, the rotating module can drive the imaging module assembled on the assembling part of the rotating module to rotate so as to change the projection direction of the imaging module. In other words, a user can change the projection direction of the imaging module by only rotating the rotating module by hand. In brief, the projection device of the invention can adjust the projection direction of the imaging module without using a tool, realizing better adjustment convenience.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
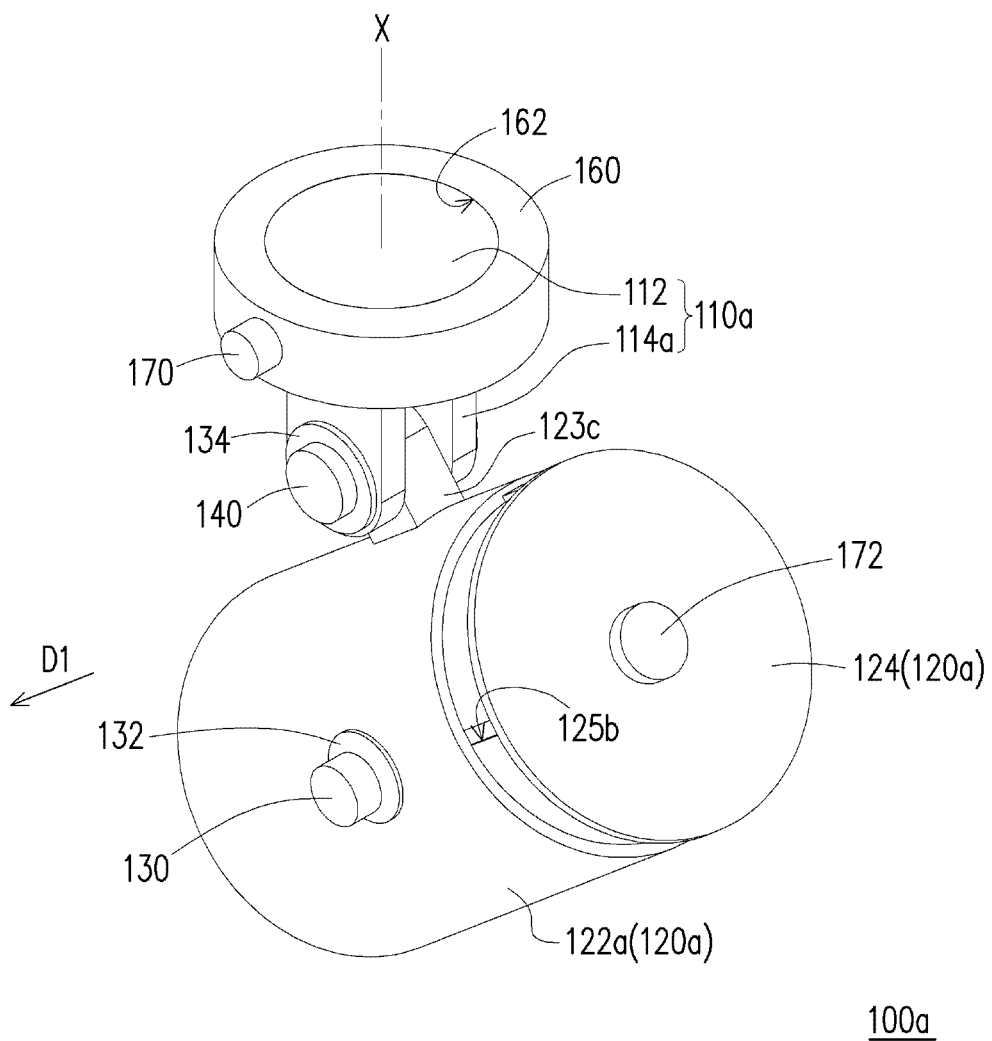
FIG. 1A is a three-dimensional view of a projection device according to an embodiment of the invention.
Figure 1B:
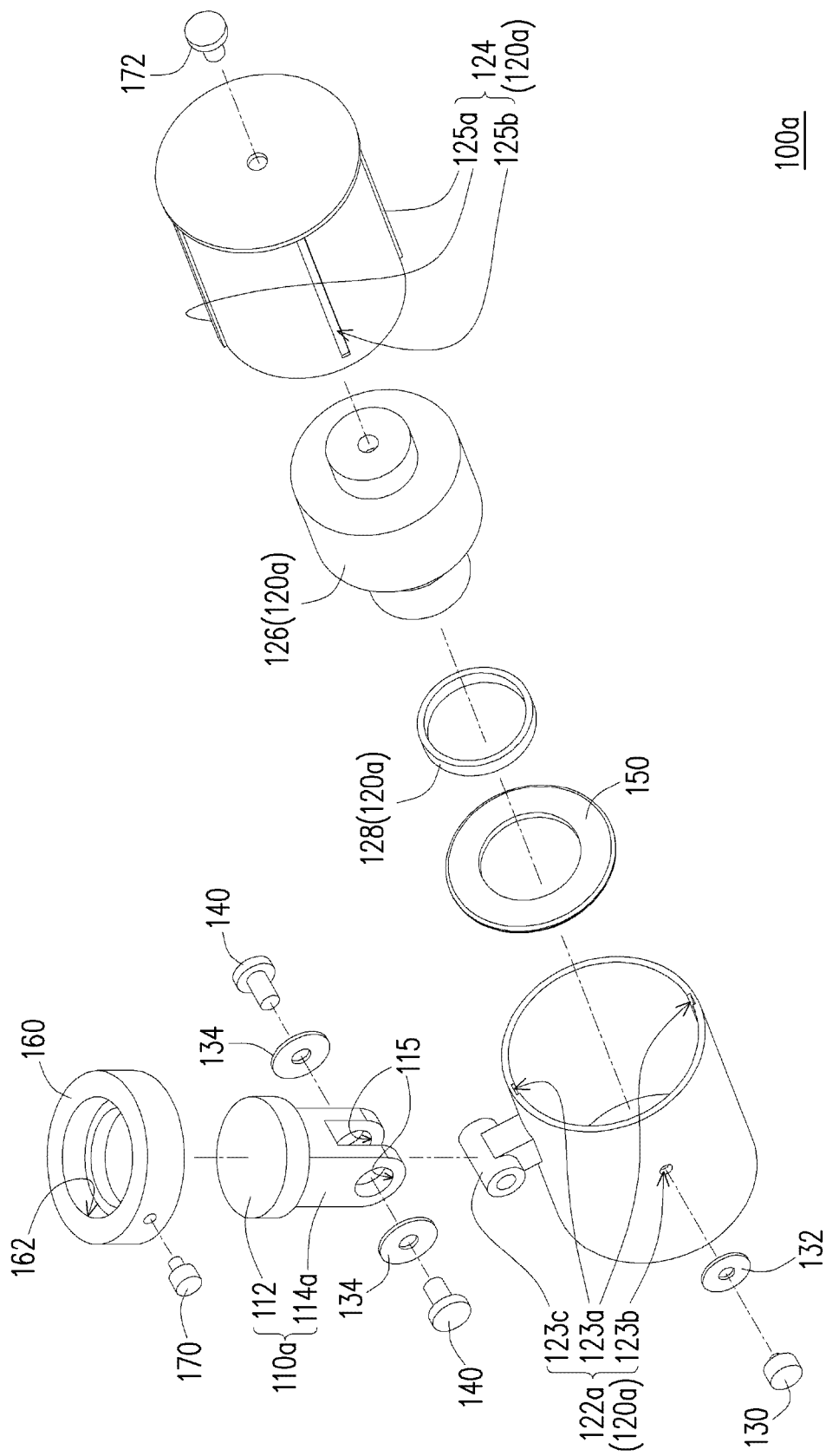
FIG. 1B is a three-dimensional exploded view of the projection device in FIG. 1A.
Figure 1C:
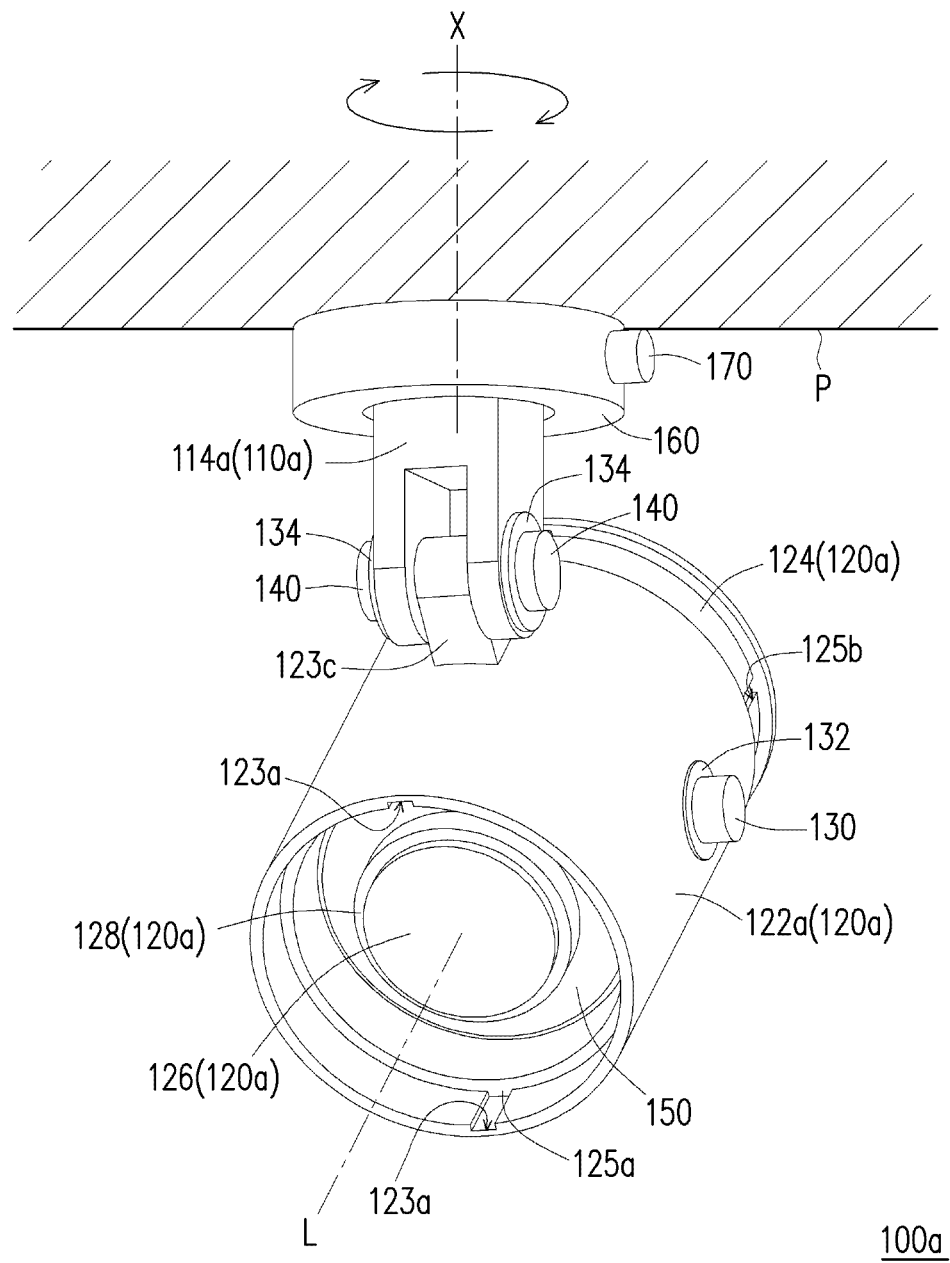
FIG. 1C is a three-dimensional view of the projection device in FIG. 1A from another perspective.
Figure 1D:
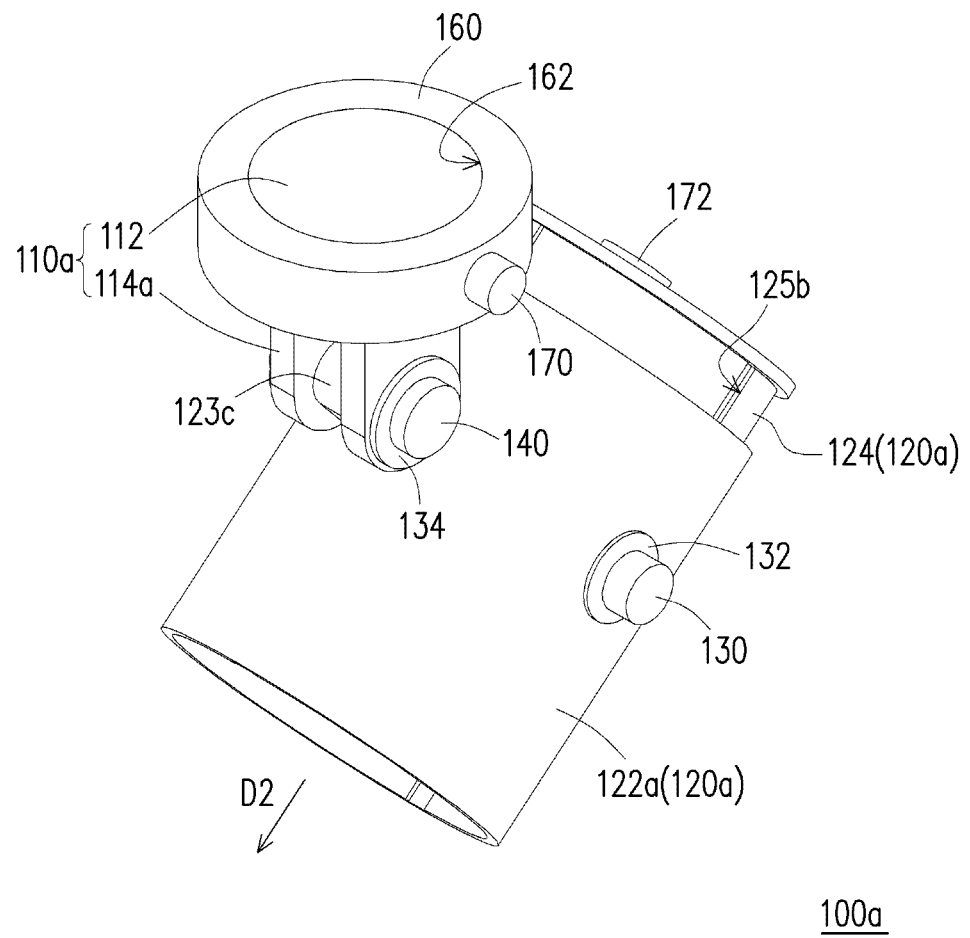
FIG. 1D is a three-dimensional view showing that the rotating module of the projection device in FIG. 1A rotates relative to the mounting surface.
Figure 1E:
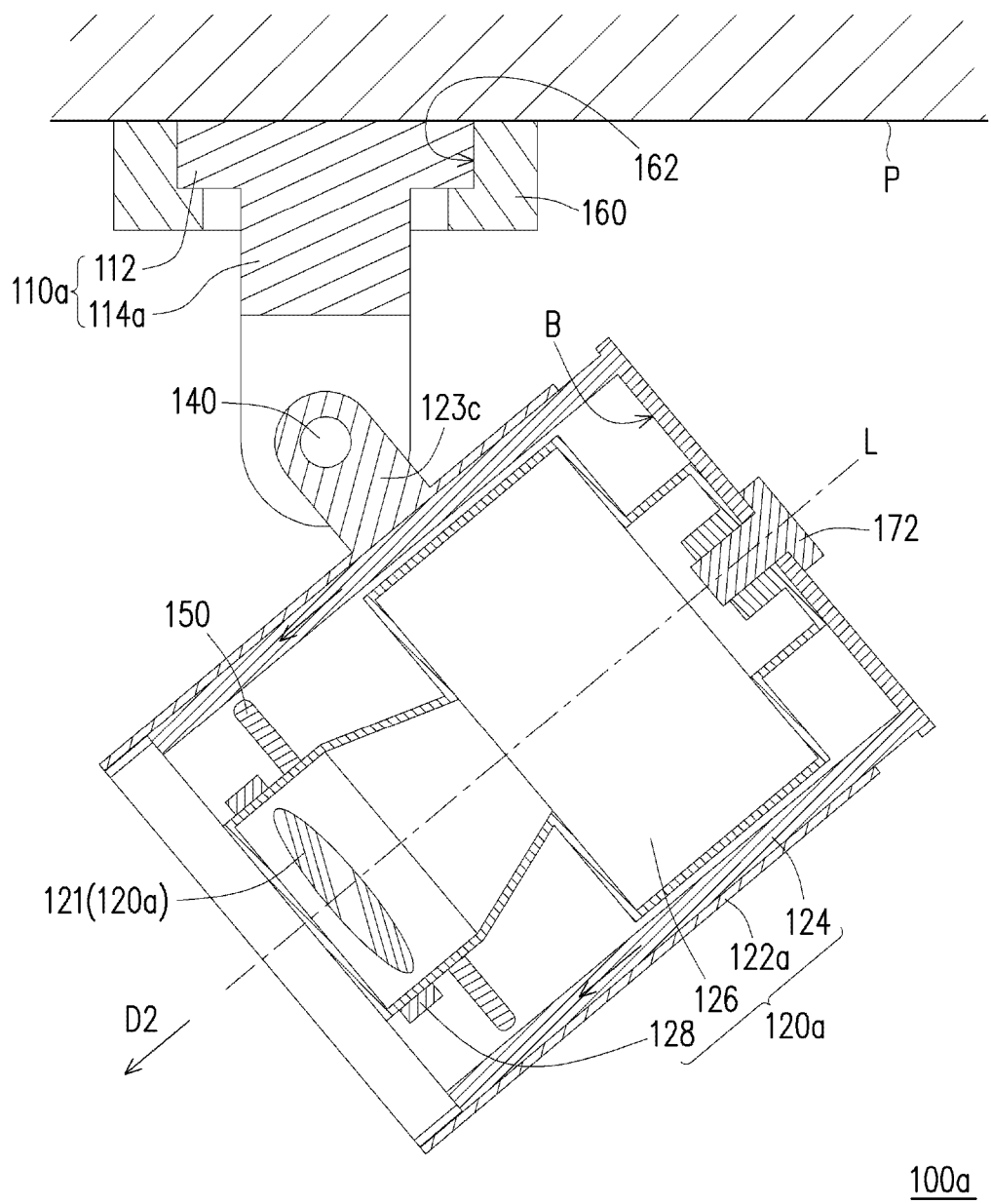
FIG. 1E is a cross-sectional view of the projection device in FIG. 1A.
Figure 1F:
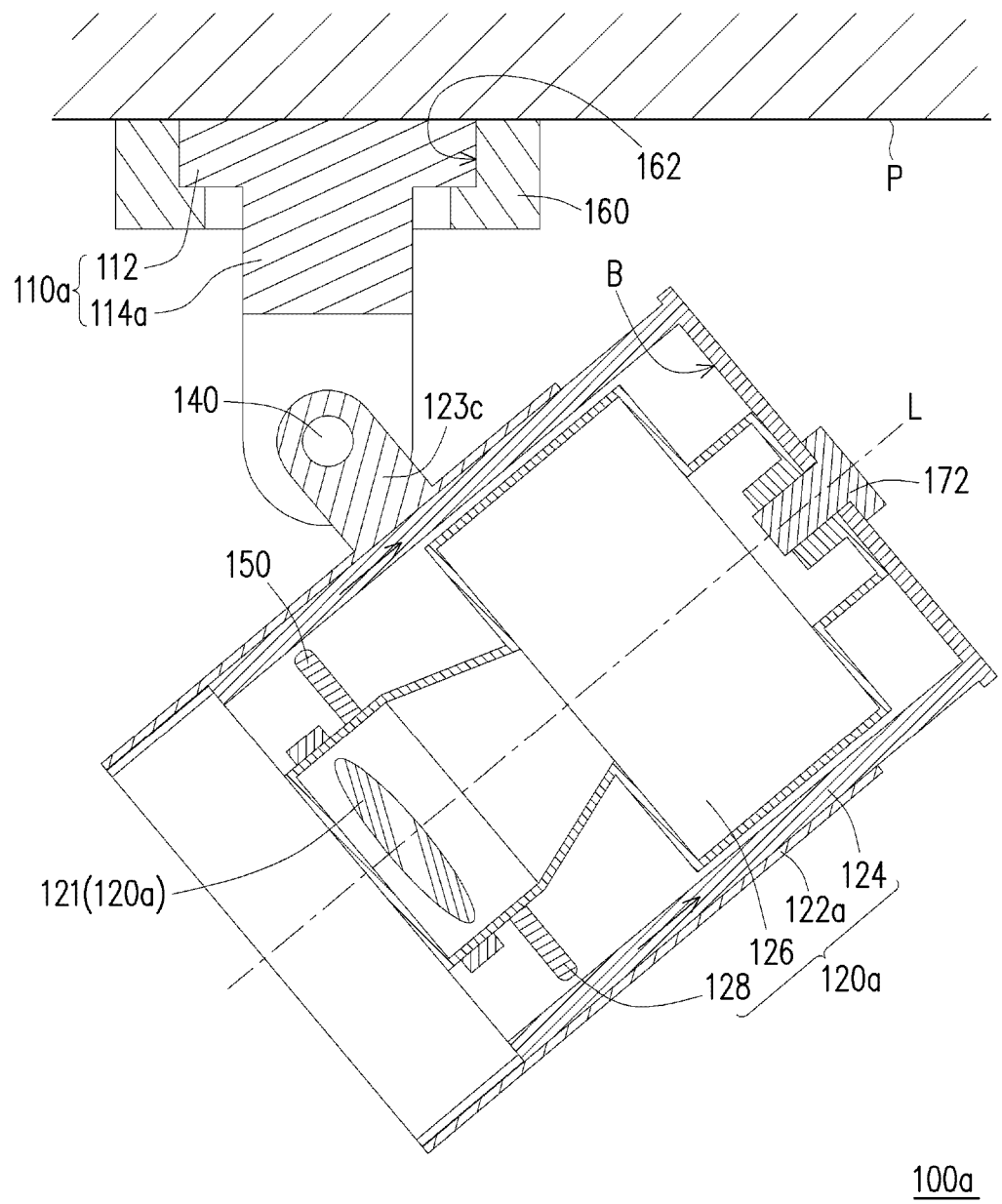
FIG. 1F is a cross-sectional view showing that the projection sleeve of the projection device in FIG. 1E moves relative to the rotating sleeve.
Figure 1G:
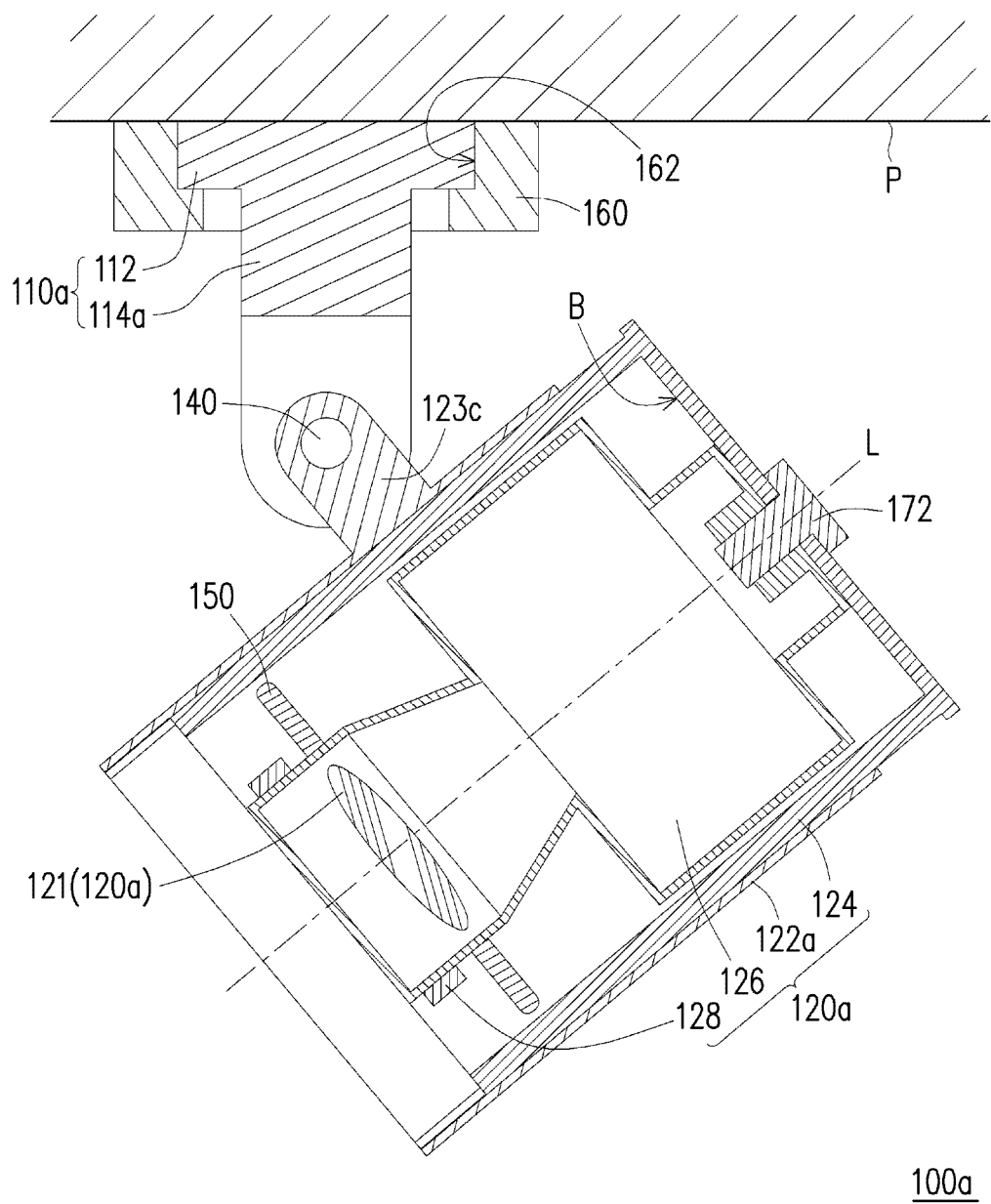
FIG. 1G is a cross-sectional view showing that the projection device in FIG. 1E rotates the adjusting ring.
Figure 1H:
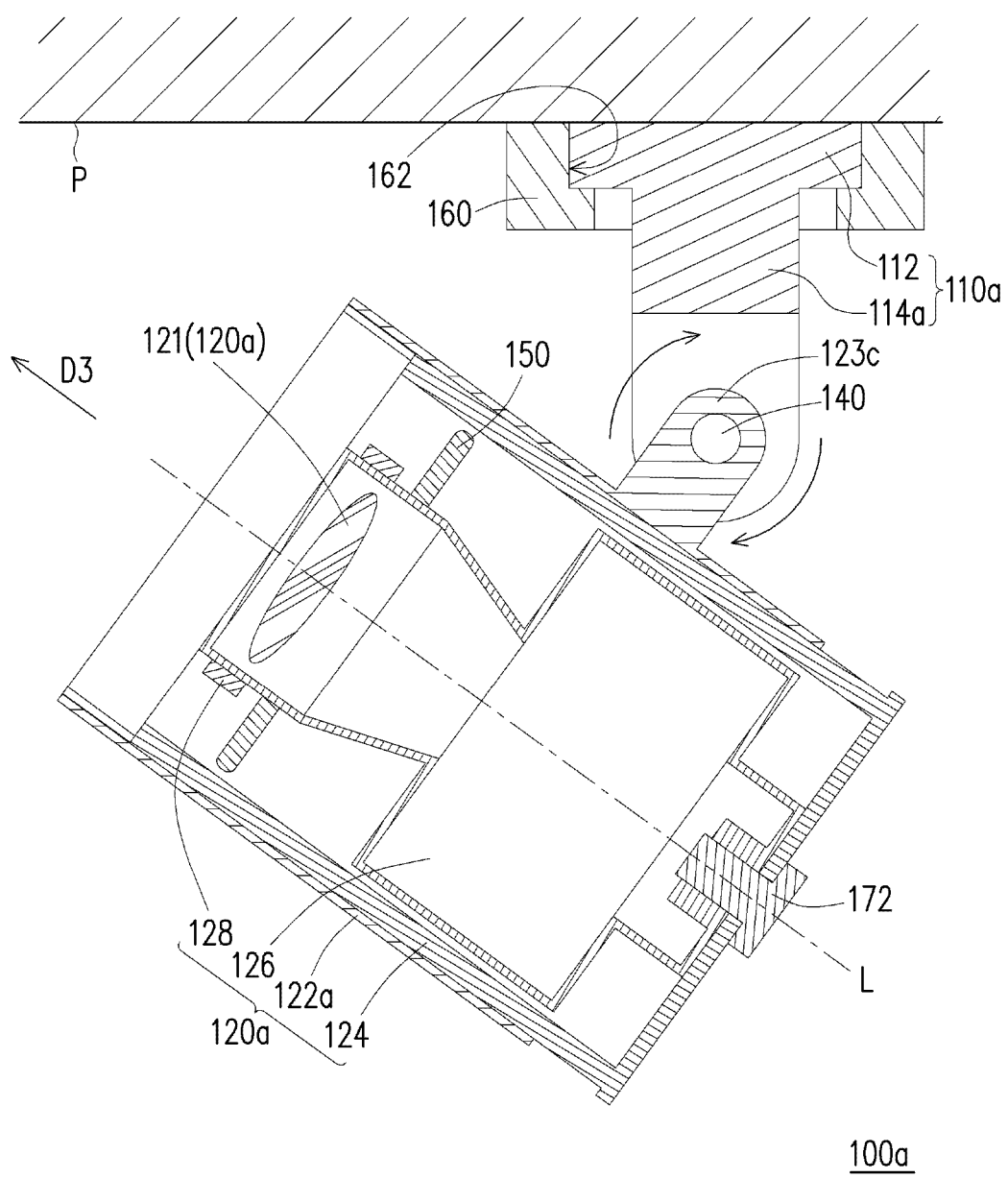
FIG. 1H is a cross-sectional view showing that the rotating sleeve of the projection device in FIG. 1E rotates relative to the rotating module.

FIG. 1A is a three-dimensional view of a projection device according to an embodiment of the invention. FIG. 1B is a three-dimensional exploded view of the projection device in FIG. 1A. FIG. 1C is a three-dimensional view of the projection device in FIG. 1A from another perspective. FIG. 1D is three-dimensional view showing that the rotating module of the projection device in FIG. 1A rotates relative to the mounting surface. FIG. 1E is a cross-sectional view of the projection device in FIG. 1A. FIG. 1F is a cross-sectional view showing that the projection sleeve of the projection device in FIG. 1E moves relative to the rotating sleeve. FIG. 1G is a cross-sectional view showing that the projection device in FIG. 1E rotates the adjusting ring. FIG. 1H is a cross-sectional view showing that the rotating sleeve of the projection device in FIG. 1E rotates relative to the rotating module.

Referring to FIG. 1A, FIG. 1B, FIG. 1C and FIG. 1E, in the present embodiment, a projection device 100a includes a rotating module 110a and an imaging module 120a. The rotating module 110a is assembled on a mounting surface P and includes a rotating part 112 and an assembling part 114a which are integrally formed. The rotating part 112 is parallel to the mounting surface P, and the assembling part 114a is perpendicular to the mounting surface P. For example, the mounting surface P is, for example, a surface of a ceiling. The imaging module 120a is assembled on the assembling part 114a of the rotating module 110a. When the rotating module 110a rotates by taking an axis X perpendicular to the mounting surface P as an axial center, the rotating module 110a drives the imaging module 120a to rotate so as to change the projection direction of the imaging module 120a. Herein, the rotatable angle of the rotating module 110a on the mounting surface P is 360 degrees, so that the imaging module 120a can realize projection in multiple directions. Specifically, the projection device 100a of the present embodiment is a hanging type projector, such as a spotlight type projector, but is not limited thereto.

Because the rotating part 112 and the assembling part 114a of the rotating module 110a are integrally formed, i.e., the rotating module 110a is of an integral design, when the rotating module 110a rotates by taking an axis X perpendicular to the mounting surface P as an axial center, the rotating module 110a can drive the imaging module 120a assembled on the assembling part 114a of the rotating module 110a to rotate so as to change the projection direction of the imaging module 120a. In other words, a user can change the projection direction of the imaging module 120a by only rotating the rotating module 110a by hand. In brief, the projection device 100a of the present embodiment can adjust the projection direction of the imaging module 120a in a mode of rotating the rotating module 110a without using a tool.

In more detail, the imaging module 120a of the present embodiment includes a lens 121, a rotating sleeve 122a, a projection sleeve 124, a projection assembly 126, and an adjusting ring 128. The rotating sleeve 122a is assembled on the assembling part 114a of the rotating module 110a, so that when the rotating module 110a rotates, the rotating sleeve 122a can rotate with the rotation of the rotating module 110a. The projection sleeve 124 is slidably arranged in the rotating sleeve 122a. Herein, the rotating sleeve 122a includes at least one groove 123a, and the projection sleeve 124 includes at least one bump 125a. The bump 125a is slidably arranged in the groove 123a, so that the projection sleeve 124 moves relative to the rotating sleeve 122a along the direction of an optical axis L of the projection assembly 126. In other embodiments not shown, the rotating sleeve includes a bump and the projection sleeve includes a groove, which is still within the protective scope of the invention. The projection assembly 126 can be locked in the projection sleeve 124 through a fixing element 172, and the adjusting ring 128 is rotatably arranged on the projection assembly 126.

Furthermore, the projection device 100a of the present embodiment also includes a limiting element 130, the rotating sleeve 122a is provided with a through hole 123b, and the projection sleeve 124 is provided with a positioning hole 125b. The limiting element 130 penetrates through the through hole 123b to be positioned in the positioning hole 125b so as to position the projection sleeve 122a and the rotating sleeve 124. In addition, the projection device 100a of the present embodiment also includes two locking elements 140, the assembling part 114a of the rotating module 110a is provided with at least one assembling hole (two assembling holes 115 are schematically shown), and the rotating sleeve 122a includes a cantilever 123c. The cantilever 123c is positioned between the two assembling holes 115, and the two locking elements 140 respectively penetrate through the two assembling holes 115 to be adjustably locked on the cantilever 123c. In order to increase the friction force, the projection device 100a of the present embodiment can also include an elastic pad 132 and two elastic pads 134. The elastic pad 132 is arranged between the rotating sleeve 122a and the limiting element 130, so that the limiting element 130 can be firmly positioned in the positioning hole 125b. The two elastic pads 134 are respectively arranged between the two assembling holes 115 and the two locking elements 140, so that each locking element 140 can be locked in the corresponding assembling hole 115. Herein, the limiting element 130 and the locking element 140 are, for example, fastening bolts, but are not limited thereto.

Furthermore, the projection device 100*a* of the present embodiment also includes an elastic baffle 150 which is disposed in the projection sleeve 124. The projection assembly 126 is positioned between the elastic baffle 150 and a bottom surface B of the projection sleeve 124, and the front end (lens side) of the projection assembly 126 penetrates through the elastic baffle 150 to be exposed to the outside of the elastic baffle 150. Due to the arrangement of the elastic baffle 150, a closed space is formed between the elastic baffle 150 and the bottom surface B of the projection sleeve 124, which has a dustproof effect and can effectively protect the projection assembly 126.

In addition, the projection device 100*a* of the present embodiment also includes a fixed seat 160 which is fixed to the mounting surface P and is provided with an assembling opening 162. The rotating part 112 of the rotating module 110*a* is positioned in the assembling opening 162. When the rotating module 110*a* rotates by taking an axis X as an axial center, the rotating module 110*a* rotates relative to the fixed seat 160. In order to fix the rotating module 110*a*, the projection device 100*a* of the present embodiment also includes a fixing element 170 which penetrates through the fixed seat 160 to be adjustably locked on the rotating part 112 of the rotating module 110*a* so as to fix the fixing seat 160 and the rotating module 110*a*.

Referring to FIG. 1A and FIG. 1D simultaneously, when the projection direction of the projection device 100*a* needs to be adjusted, a user can firstly loosen the fixing element 170 by hand and then rotate the rotating module 110*a* by hand to drive the imaging module 120*a* to rotate so as to change the projection direction of the imaging module 120*a*. After the direction for projection is determined, the user can lock the fixing element 170 by hand so as to fix the position of the rotating module 110*a*. In this case, the projection direction of the imaging module 120*a* is rotated from the original direction D1 in FIG. 1A to the direction D2 in FIG. 1D.

Referring to FIG. 1B, FIG. 1E and FIG. 1F simultaneously, when the size of a projection image of the projection device 100*a* needs to be adjusted, a user can firstly loosen the limiting element 130 by hand, i.e., the limiting element 130 does not interfere with the positioning hole 125*b* of the projection sleeve 124. Then, the user can pull the projection sleeve 124 by hand to enable the bump 125*a* of the projection sleeve 124 to slide in the groove 123*a* of the rotating sleeve 122*a*, and the projection sleeve 124 to move relative to the rotating sleeve 122*a* along the direction of an optical axis L so as to change the size of the image projected by the projection assembly 126. After the size of the image to be projected is determined, the user can position the limiting element 130 in the positioning hole 125*b* by hand so as to fix the positions of the projection sleeve 122*a* and the rotating sleeve 124.

Referring to FIG. 1E and FIG. 1G simultaneously, when the projection focus of the projection assembly 126 needs to be changed, a user can rotate the adjusting ring 128 by hand to adjust the position of the lens 121 so as to change the projection focus of the projection assembly 126. In other words, due to the design of the adjusting ring 128, the user can adjust the focus manually, thereby saving the cost and space. In addition to adjusting the definition by the adjusting ring 128, the projection focus can be finely adjusted back and forth by loosening or locking the projection assembly 126 through the fixing element 172, thereby further adjusting the image definition.

In addition to changing the projection direction of the imaging module 120*a* by rotating the rotating module 110*a*, another adjustment mode for changing the projection direction is to rotate the rotating sleeve 122*a*. Referring to FIG. 1E and FIG. 1H simultaneously, a user can loosen the locking element 140 by hand and rotate the rotating sleeve 122*a* for an angle relative to the assembling part 114*a* of the rotating module 110*a* by taking the assembling hole 115 or the locking element 140 as a rotation axis. When the rotating sleeve 122*a* is rotated to the direction to be projected (such as a direction D3), the locking element 140 is locked. That is, the user can rotate and position the rotating sleeve 122*a* by hand and then directly rotate and lock the locking element 140 by hand so as to fix the angle of the rotating sleeve 122*a* relative to the assembling part 114*a* of the rotating module 110*a*. In brief, the cantilever 123*c* pivoted to the assembling hole 115 can drive the imaging module 120*a* to swing to the required position by loosening the locking element 140 so as to change the projection direction of the imaging module 120*a*, so that the projection device 100*a* can project on the ground and can even project on the mounting surface P (ceiling).

In brief, the user can rotate the rotating module 110*a* and the rotating sleeve 122*a* by hand so as to adjust the projection of the projection device 100*a* in the three-dimensional direction. That is, the rotating module 110*a* can be rotated to adjust the position of the projection device 100*a* in the X-Y direction (not shown, such as a horizontal direction), and the rotating sleeve 122*a* can be rotated to adjust the position of the projection device 100*a* in the X-Z direction (not shown, such as a vertical direction). Since the projection device 100*a* of the present embodiment adjusts the projection direction by hand, there is no need of using a tool or excessive indirect adjusting elements, realizing better adjustment convenience. Furthermore, the projection device 100*a* of the present embodiment does not need a too large volume to contain the indirect adjusting elements, and thus can have a smaller volume. In addition, since the projection device 100*a* of the present embodiment does not require the use of the indirect adjusting elements, the elements are simple and easy to assemble and have the advantages in cost and use.

It should be noted here that the following embodiments use the element symbols and partial contents of the above embodiments, same symbols are used to refer to same or similar elements, and the descriptions of the same technical contents are omitted. For the description of the omitted portions, reference may be made to the foregoing embodiments, and the descriptions are omitted in the following embodiments.

Figure 2:
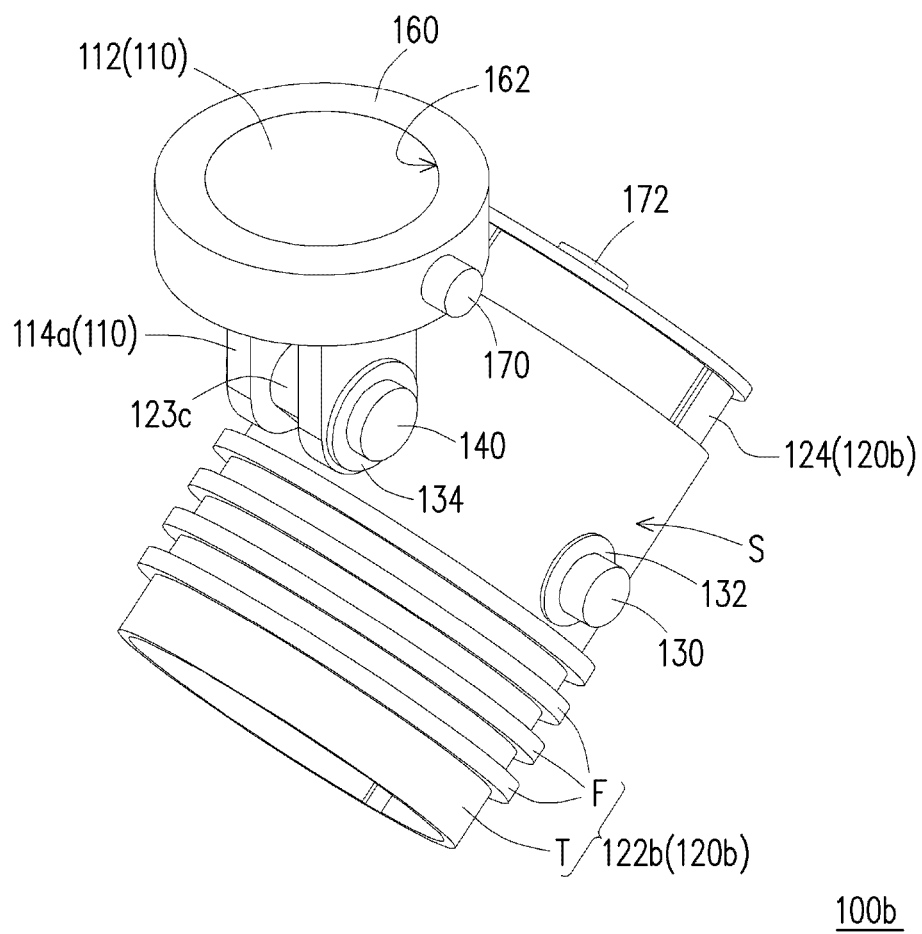
FIG. 2 is a three-dimensional view of a projection device according to another embodiment of the invention.

FIG. 2 is a three-dimensional view of a projection device according to another embodiment of the invention. Referring to FIG. 1A and FIG. 2 simultaneously, a projection device 100*b* of the present embodiment is similar to the projection device 100*a* in FIG. 1A, and the difference between the projection device 100*b* and the projection device 100*a* is as follows: the rotating sleeve 122*b* of the imaging module 120*b* of the present embodiment also includes a sleeve body T and a plurality of heat dissipation fins F, wherein the heat dissipation fins F are dispersedly arranged on the outer surface S of the sleeve body T, so that the heat dissipation effect of the projection device 100*b* can be improved.

Figure 3A:
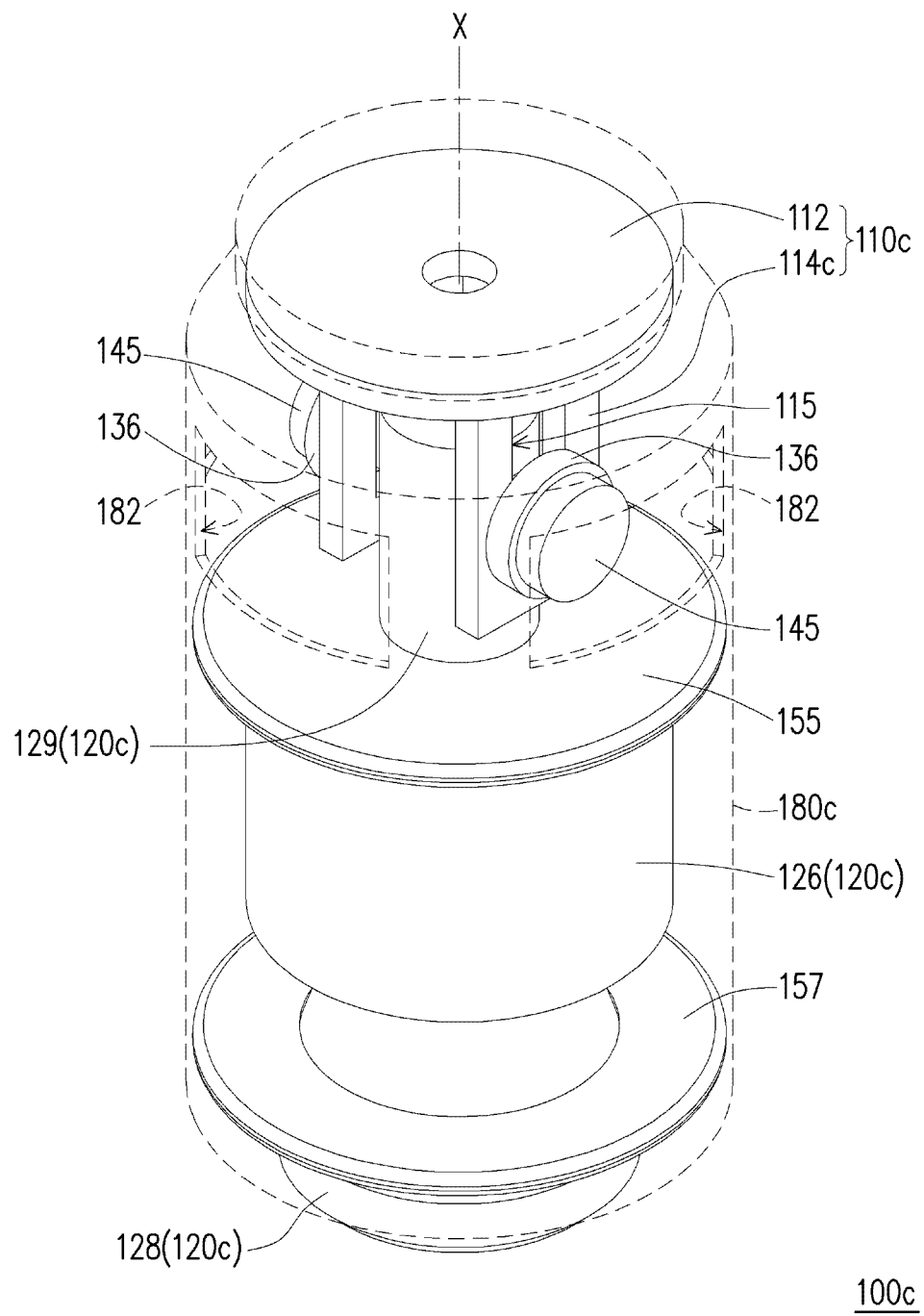
FIG. 3A is a three-dimensional view of a projection device according to another embodiment of the invention.
Figure 3B:
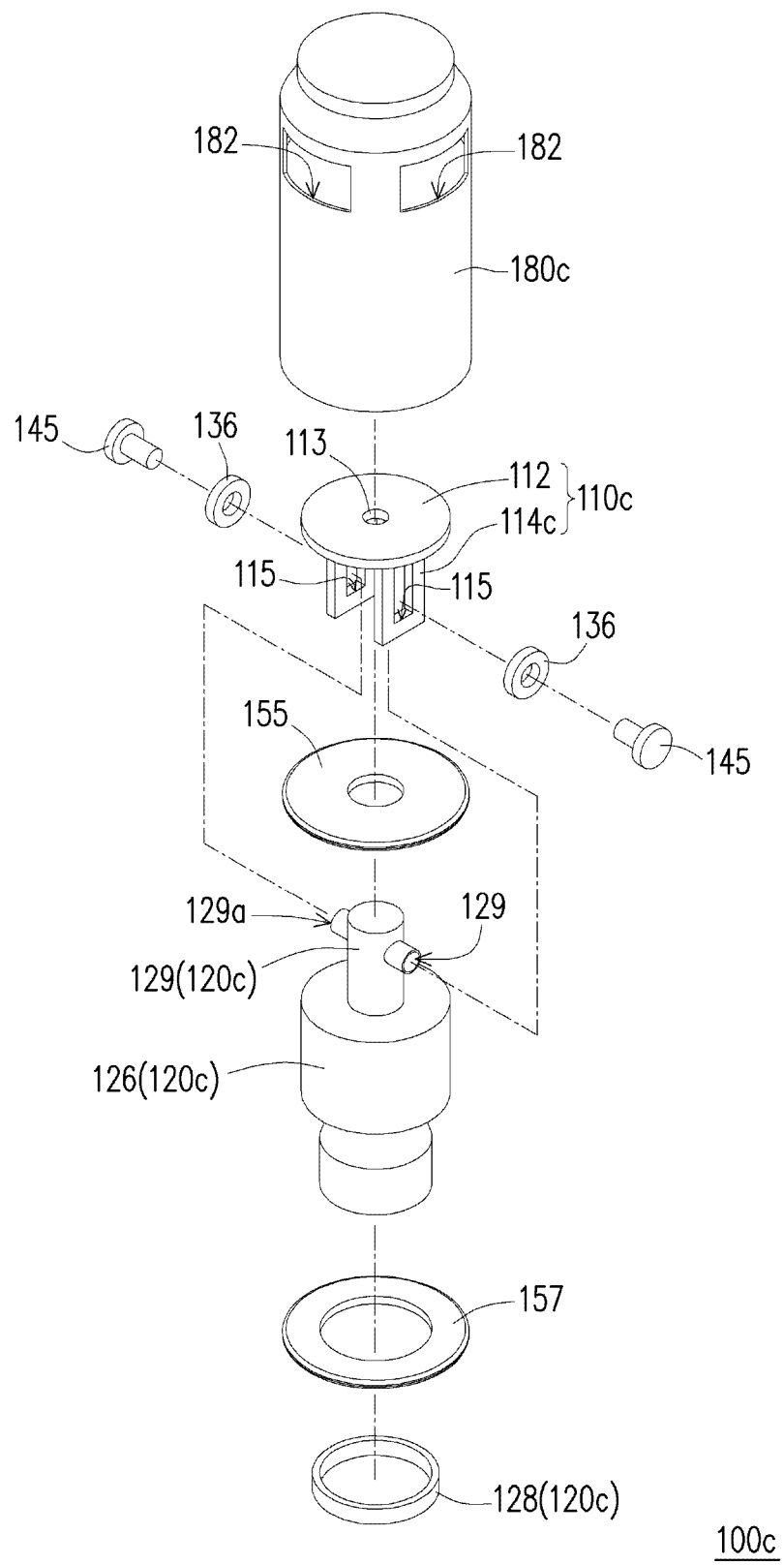
FIG. 3B is a three-dimensional exploded view of the projection device in FIG. 3A.
Figure 3C:
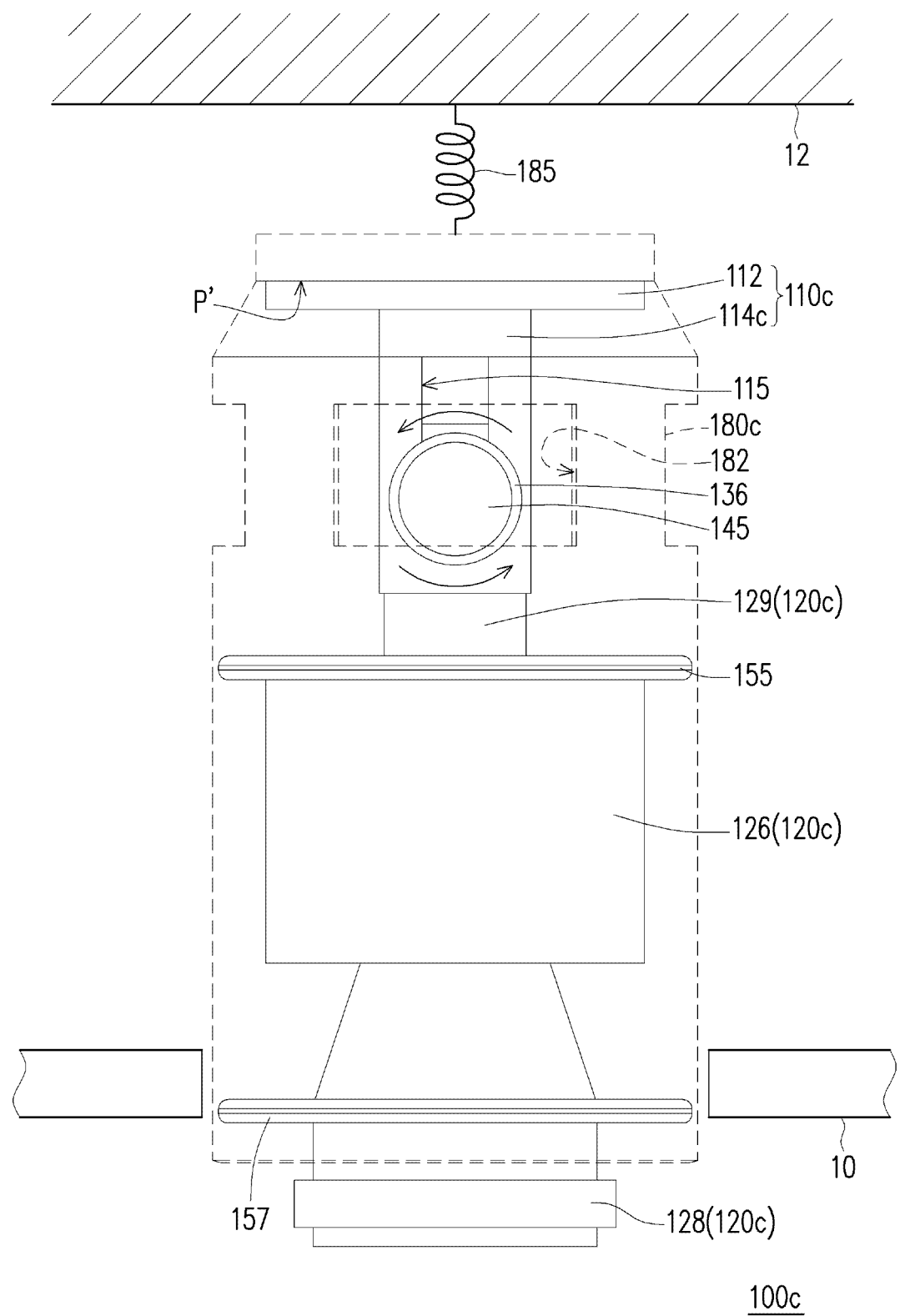
FIG. 3C is a side view of the projection device in FIG. 3A.
Figure 3D:
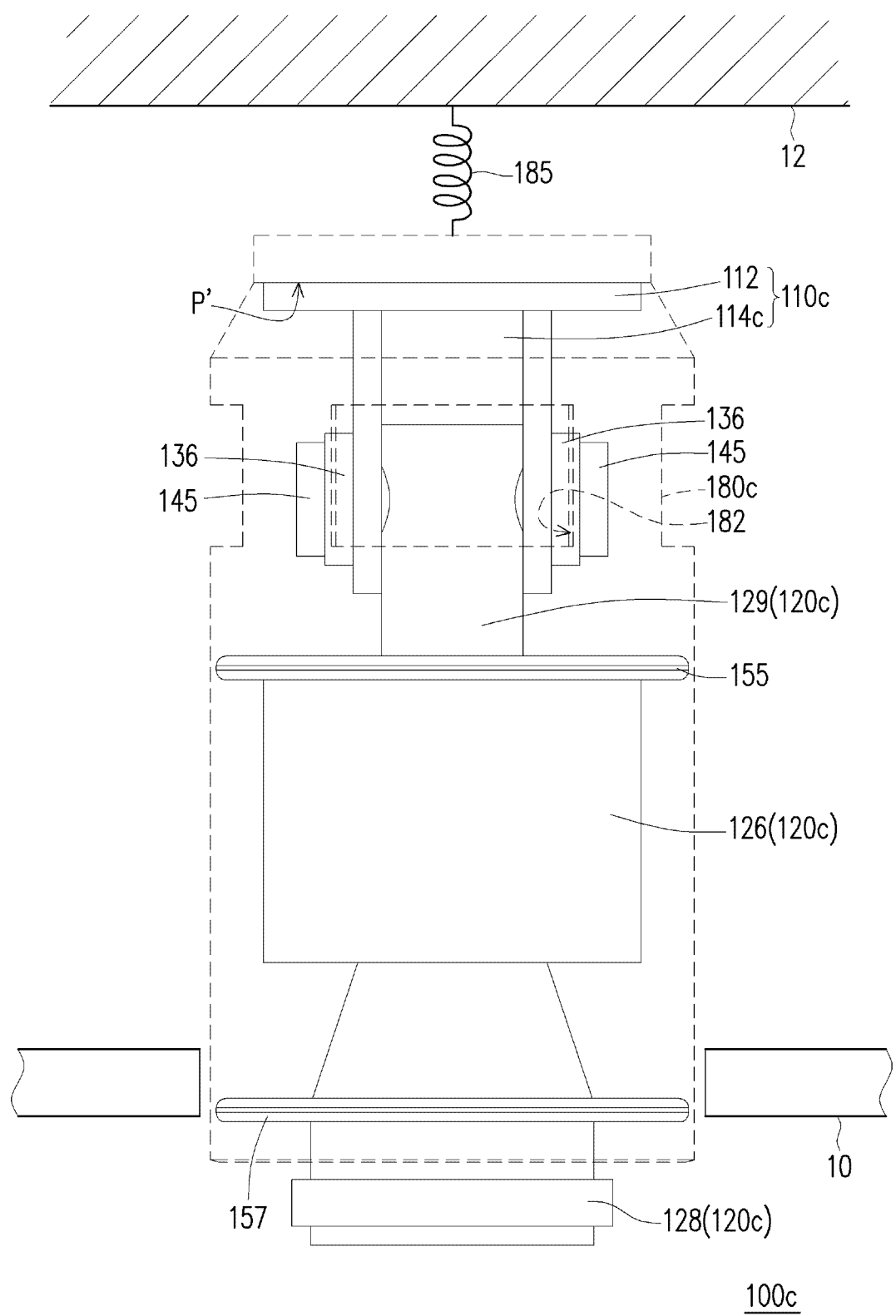
FIG. 3D is a side view showing that the rotating module of the projection device in FIG. 3C rotates relative to the mounting surface.
Figure 3E:
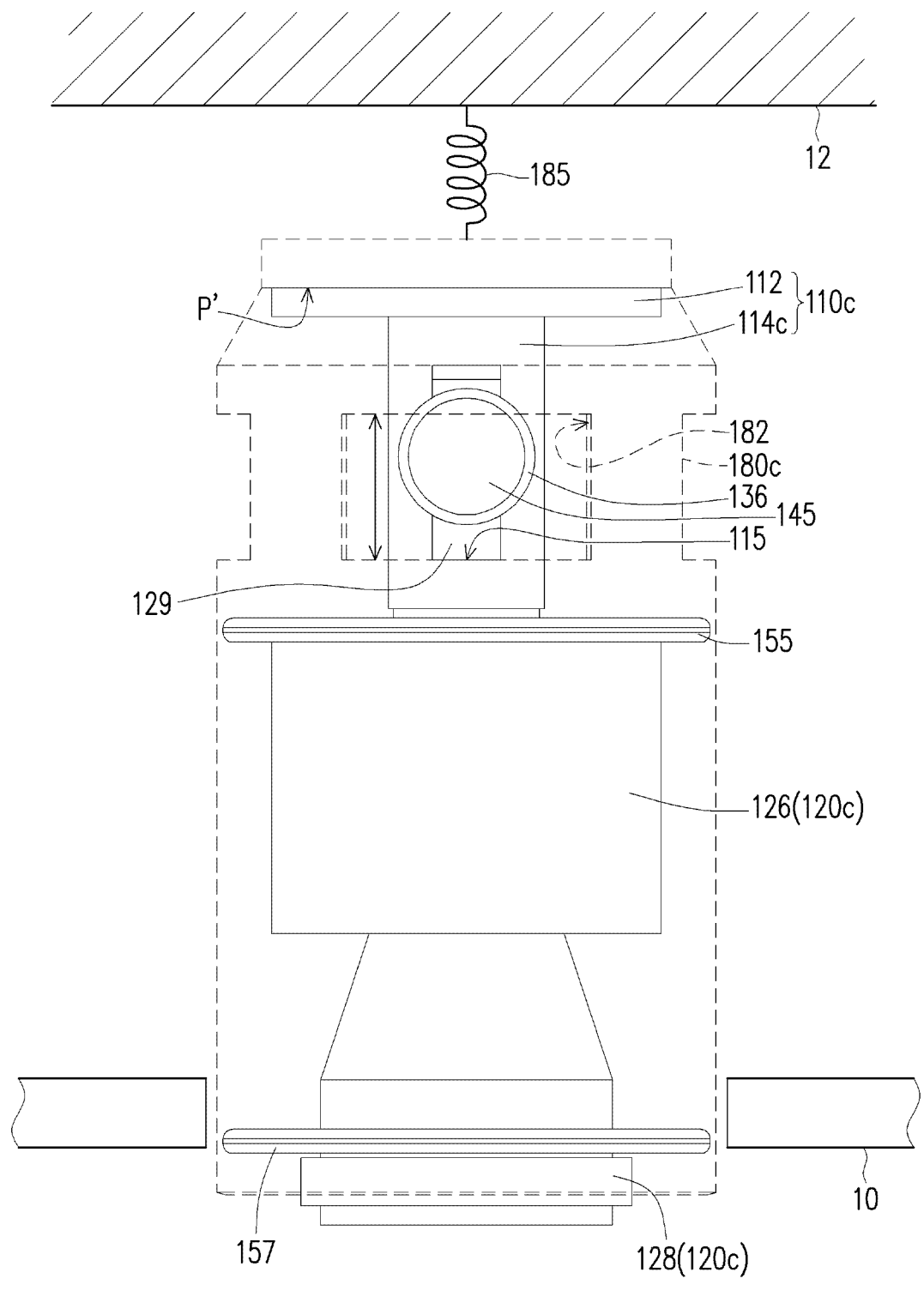
FIG. 3E is a side view showing that the fastening part of the imaging module of the projection device in FIG. 3C moves relative to the rotating part.
Figure 3F:
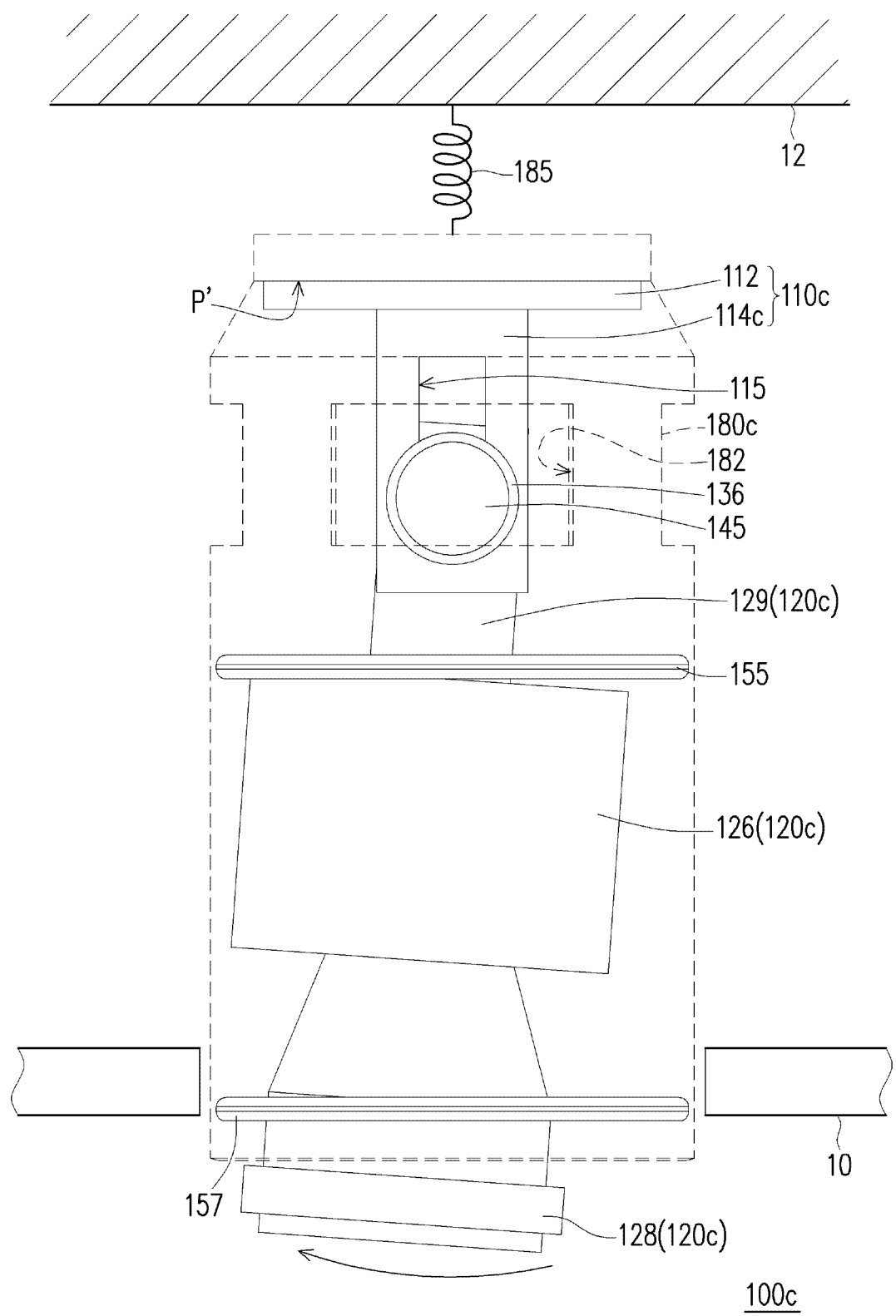
FIG. 3F and FIG. 3G are side views showing that the projection assembly of the projection device in FIG. 3C swings relative to the rotating module.
Figure 3G:
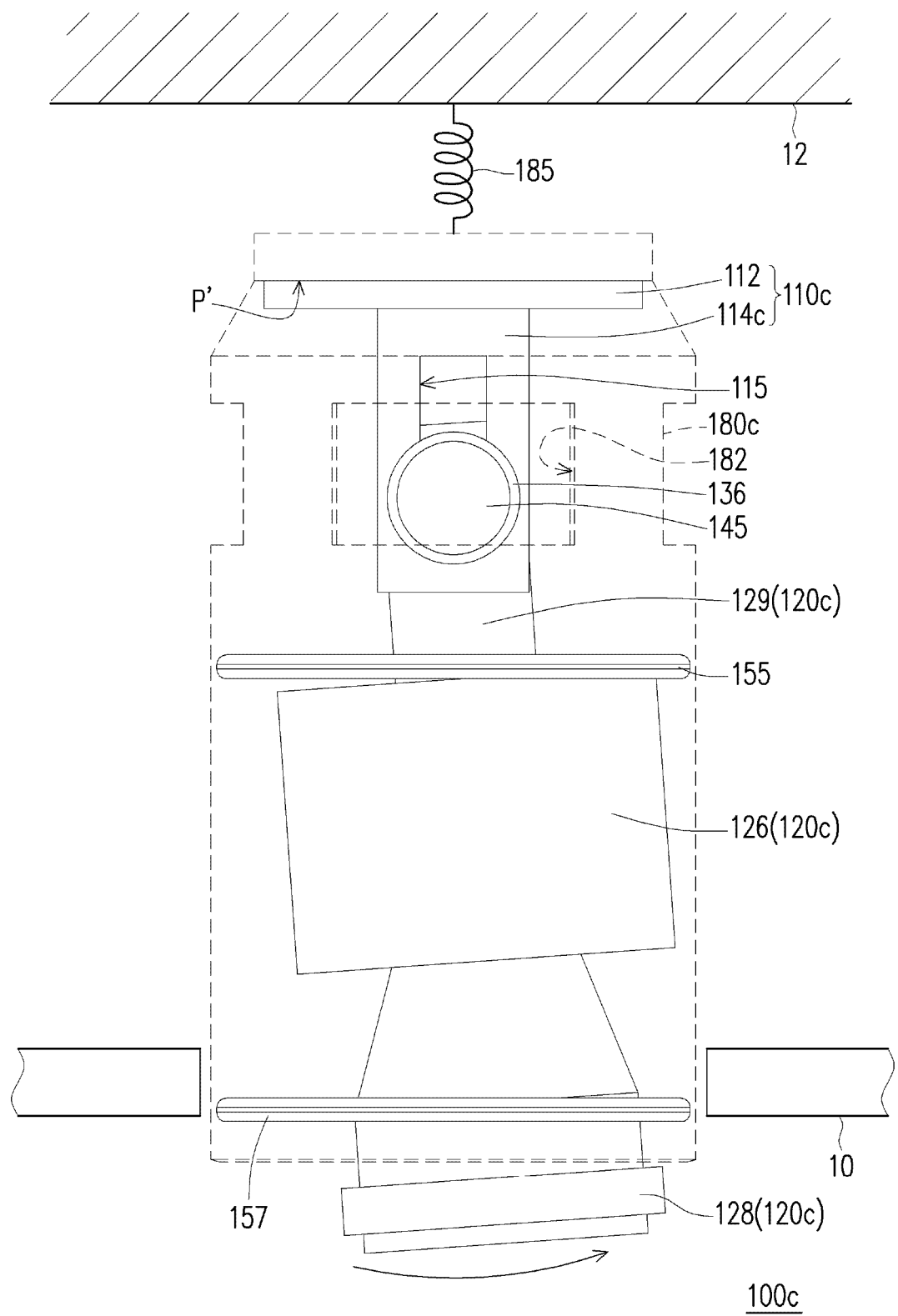
Figure 3H:
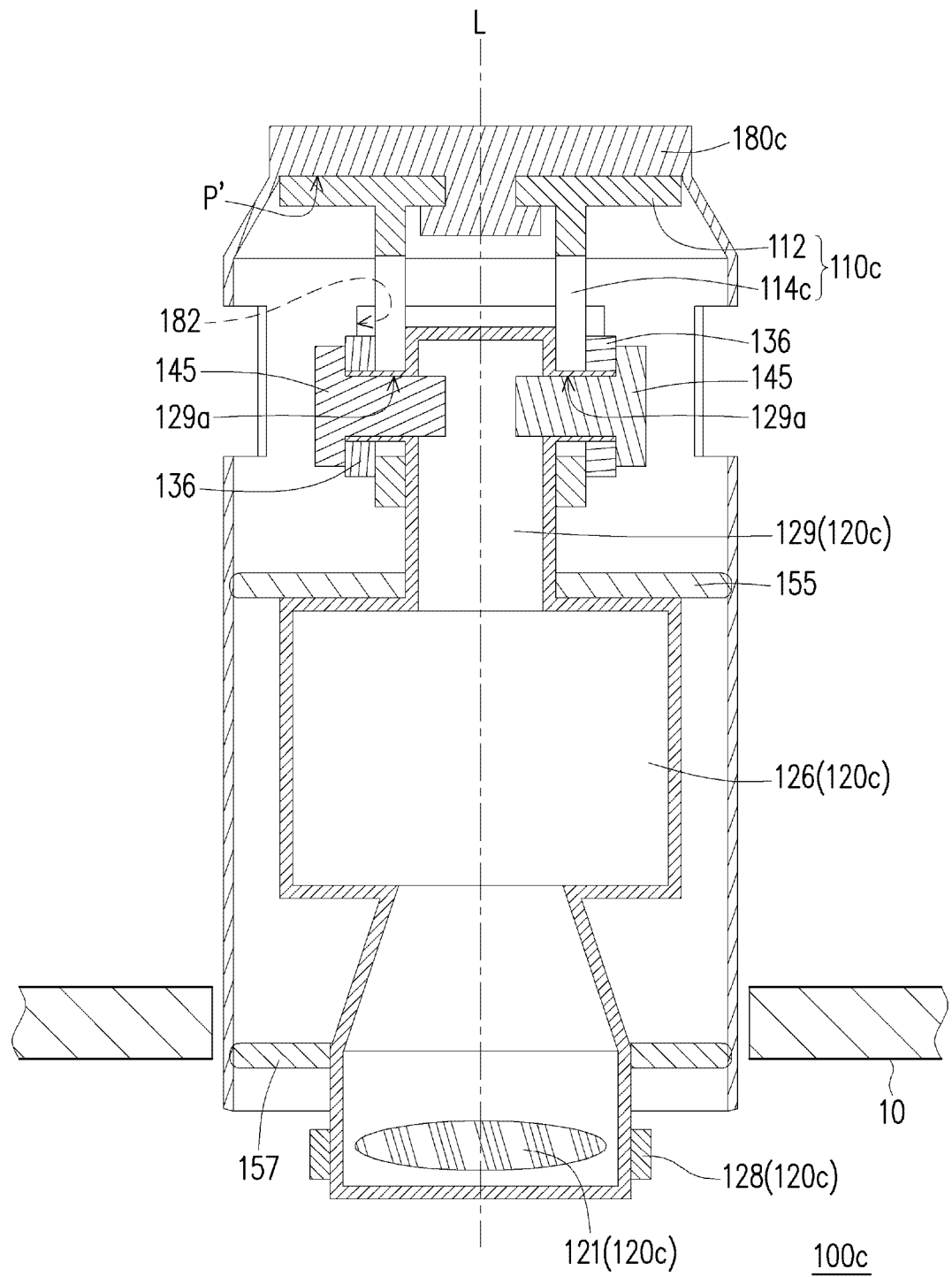
FIG. 3H and FIG. 3I are cross-sectional views before and after the projection device in FIG. 3C rotates the adjusting ring.
Figure 3I:
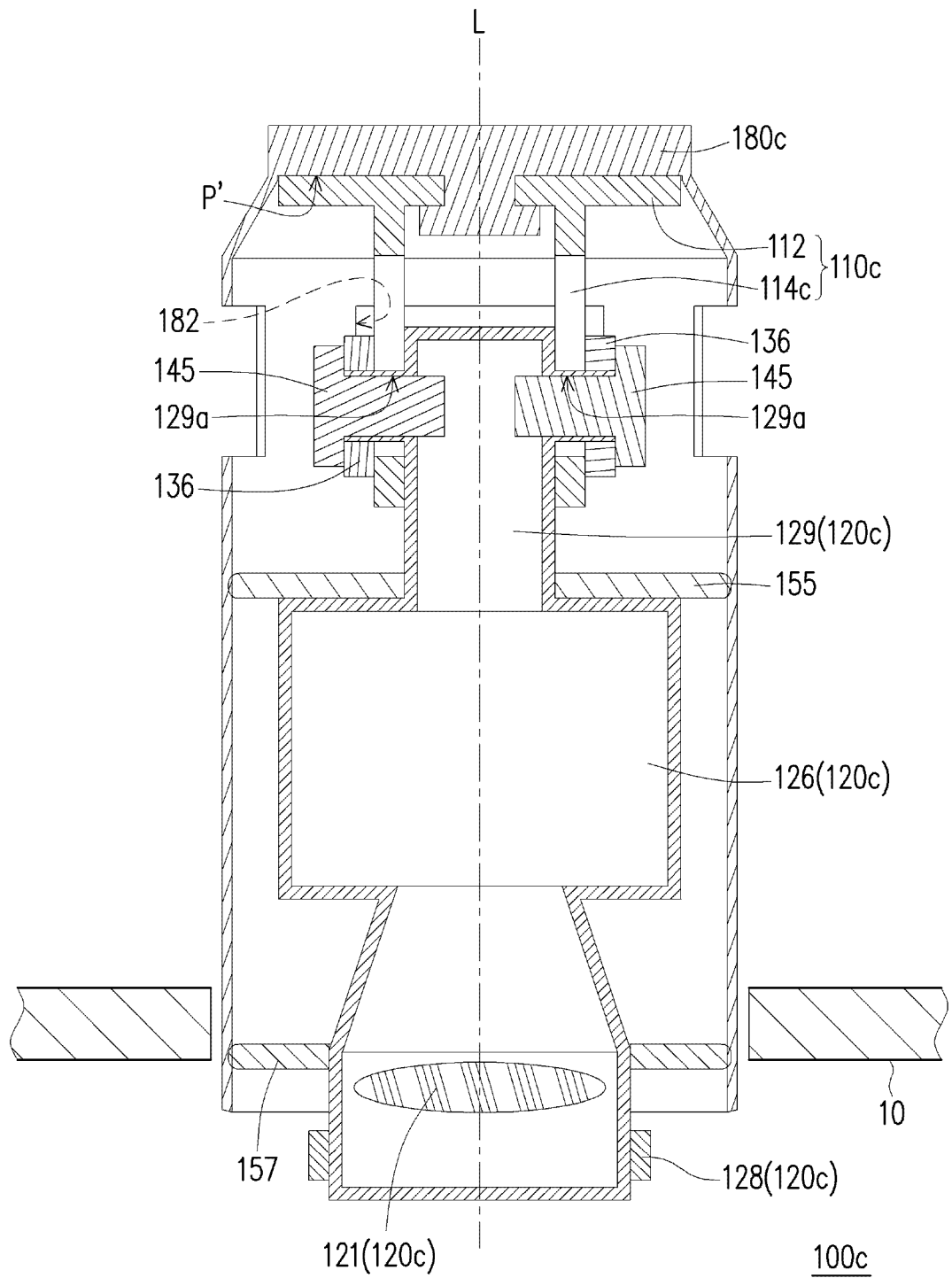

FIG. 3A is a three-dimensional view of a projection device according to another embodiment of the invention. FIG. 3B is a three-dimensional exploded view of the projection device in FIG. 3A. FIG. 3C is a side view of the projection device in FIG. 3A. FIG. 3D is a side view showing that the rotating module of the projection device in FIG. 3C rotates relative to the mounting surface. FIG. 3E is a side view showing that the fastening part of the imaging module of the projection device in FIG. 3C moves relative to the rotating part. FIG. 3F and FIG. 3G are side views showing that the projection assembly of the projection device in FIG. 3C swings relative to the rotating module. FIG. 3H and FIG. 3I are cross-sectional views before and after the projection device in FIG. 3C rotates the adjusting ring. It should be noted that for convenience of explanation, some elements are omitted in FIG. 3A, FIG. 3B, FIG. 3H and FIG. 3I, and the containing shells in FIG. 3A and FIG. 3C to FIG. 3G are all marked by dotted lines.

Referring to FIG. 1B, FIG. 3A, FIG. 3B, FIG. 3C and FIG. 3H simultaneously, a projection device 100c of the present embodiment is similar to the projection device 100a in FIG. 1B, and the difference between the projection device 100c and the projection device 100a is as follows: the imaging module 120c of the present embodiment is different from the imaging module 120a in FIG. 1B, and the projection device 100c of the present embodiment also includes a containing shell 180c and an elastic element 185. The rotating module 110c and the imaging module 120c are positioned in the containing shell 180c, and the elastic element 185 is connected to the containing shell 180c and the inner wall 12 of a ceiling 10. Herein, the projection device 100c is specifically implemented as an embedded type projector embedded in the ceiling 10.

In detail, the imaging module 120c of the present embodiment is composed of a lens 121, a projection assembly 126, an adjusting ring 128, and a fastening part 129 connected to the projection assembly 126. The fastening part 129 of the imaging module 120c is provided with at least one fastening hole (two fastening holes 129a are schematically shown), and at least one opening (a plurality of openings 182 are schematically shown) of the containing shell 180c exposes a portion of the fastening part 129. Furthermore, the projection device 100c of the present embodiment also includes two fastening elements 145, and the assembling part 114c of the rotating module 110c is provided with at least one slide groove (two slide grooves 115 are schematically shown). The slide grooves 115 extend along a direction perpendicular to a mounting surface P', and the fastening part 129 is positioned between the two slide grooves 115 and is slidably arranged in the slide grooves 115. The fastening elements 145 can respectively penetrate through the two slide grooves 115 to be positioned in the two fastening holes 129a, i.e., the fastening part 129 is pivoted to the two slide grooves 115. When the fastening elements 145 respectively penetrate through the two slide grooves 115 to be locked in the two fastening holes 129a, the fastening part 129 is limited to move relative to the rotating part 112 of the rotating module 110c. Herein, the fastening elements 145 are, for example, fastening bolts, but are not limited thereto. In order to increase the friction force, the projection device 100c of the present embodiment also includes two elastic pads 136 which are respectively arranged between the two slide grooves 115 and the two fastening elements 145.

Furthermore, the projection device 100c of the present embodiment also includes a first elastic baffle 155 and a second elastic baffle 157. The first elastic baffle 155 and the second elastic baffle 157 are both disposed in the containing shell 180c, and the first elastic baffle 155 is positioned between the fastening part 129 and the projection assembly 126. The first elastic baffle 155 and the second elastic baffle 157 respectively sleeve two opposite ends of the projection assembly 126, and the projection assembly 126 is positioned between the first elastic baffle 155 and the second elastic baffle 157. The front end (lens side) of the projection assembly 126 penetrates through the second elastic baffle 157 to be exposed to the outside of the second elastic baffle 157. The arrangement of the first elastic baffle 155 and the second elastic baffle 157 can prevent dust from entering the projection assembly 126. The first elastic baffle 155 and the second elastic baffle 157 are, for example, bellows type separation blades.

Referring to FIG. 3C and FIG. 3D simultaneously, the projection assembly 126 of the present embodiment is connected to the rotating module 110c by the fastening elements 145, and the rotating module 110c can rotate along an axis X as an axial center. Therefore, the user can hold and rotate the projection assembly 126 by hand from one end of the containing shell 180c exposed to the outside of the ceiling 10 so as to adjust a projection image.

Referring to FIG. 3A, FIG. 3C and FIG. 3E simultaneously, a user can firstly pull the containing shell 180c out of the ceiling 10 through the elasticity of the elastic element 185, and then put the hand into the opening 182 of the containing shell 180c to loosen or lock the fastening elements 145. The fastening elements 145 can guide the fastening part 129 to move relative to the rotating part 112 of the rotating module 110c so as to change the size of an image projected by the projection assembly 126. In other words, the projection assembly 126 of the present embodiment can move up and down (along an axis X) in the slide groove 115 of the assembling part 114c through the fastening part 129, so that the projection distance can be adjusted. Since the elastic pad 136 is arranged between the fastening element 145 and the slide groove 115, the projection assembly 126 can be fixed to the position desired by the user by the friction force between the elastic pad 136 and the outer wall of the assembling part 114c; or the fastening element 145 is firstly loosened, and after the projection assembly 126 is moved to the position desired by the user, the fastening element 145 is fastened, thereby fixing the position of the projection assembly 126.

Referring to FIG. 3F and FIG. 3G simultaneously, the fastening part 129 drives the imaging module 120c to swing so as to change the projection direction of the imaging module 120c. The user loosens the fastening element 145 by hand, and after the projection assembly 126 is moved to incline, the fastening element 145 is locked, so that the projection direction of the imaging module 120c can be adjusted.

Referring to FIG. 3H and FIG. 3I simultaneously, when the projection focus of the projection assembly 126 needs to be changed, the user can rotate the adjusting ring 128 by hand to adjust the position of the lens 121 so as to change the projection focus of the projection assembly 126. In other words, due to the design of the adjusting ring 128, the user can adjust the focus manually, thereby saving the cost and space.

In brief, the user can adjust the projection direction of the projection device 100c by hand. That is, the rotating module 110c can rotate relative to the containing shell 180c, and the fastening part 129 drives the imaging module 120c to swing so as to change the projection direction of the imaging module 120c. Furthermore, since the projection device 100c of the present embodiment can adjust the projection direction by hand, there is no need of using a tool or excessive indirect adjusting elements, realizing better adjustment convenience. In addition, since the projection device 100c of the present embodiment is embedded in the ceiling 10, when it is necessary to rotate or deviate the projection image, it is only necessary to grasp the lens side of the projection assembly 126 by hand to adjust the projection direction, and the adjustment convenience is better.

Figure 4:
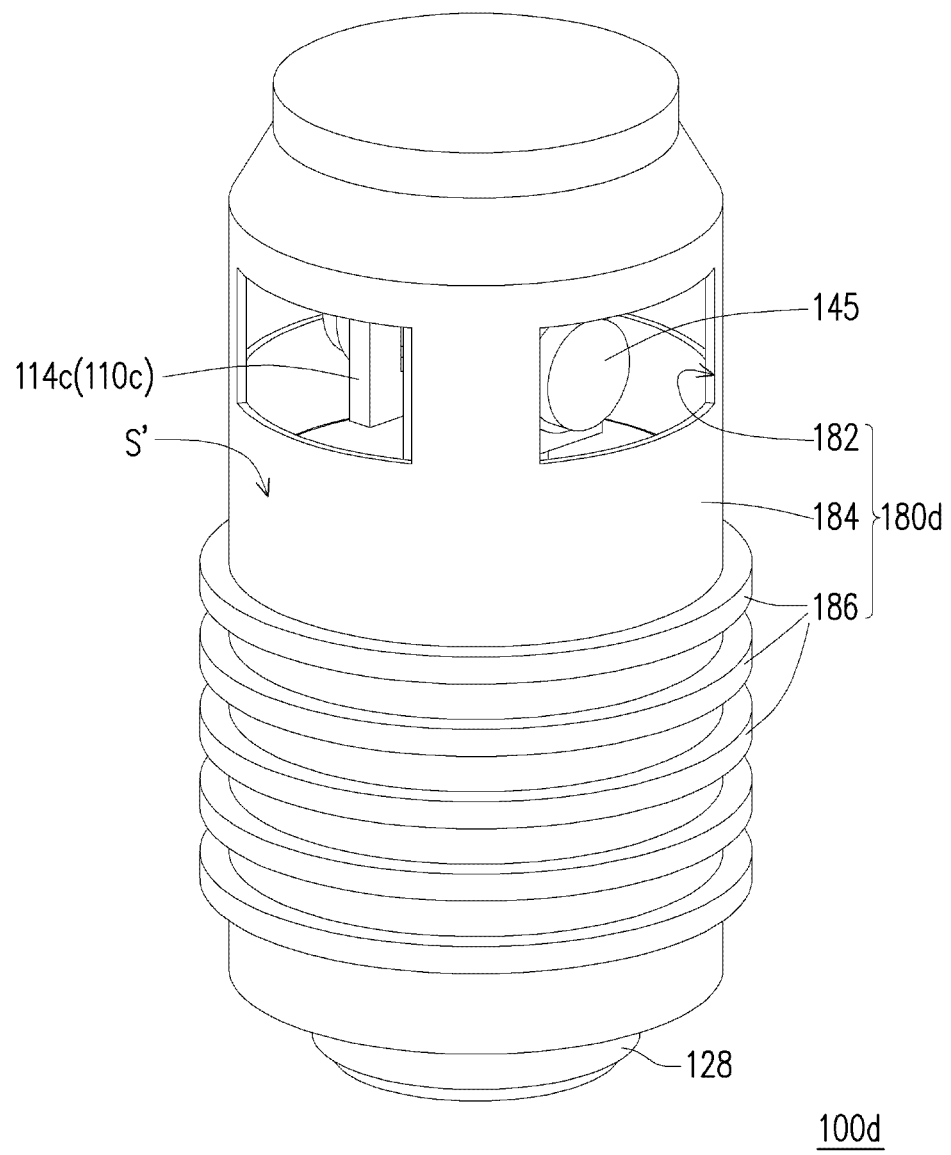
FIG. 4 is a three-dimensional view of a projection device according to another embodiment of the invention.

FIG. 4 is a three-dimensional view of a projection device according to another embodiment of the invention. Referring to FIG. 4 and FIG. 3A simultaneously, a projection device 100d of the present embodiment is similar to the projection device 100c in FIG. 3A, and the difference between the projection device 100d and the projection device 100c is as follows: the containing shell 180d of the present embodiment further includes a body 184 and a plurality of heat dissipation fins 186 in addition to the opening 182, where the heat dissipation fins 186 are dispersedly arranged on the outer surface S' of the body 184, so that the heat dissipation effect of the projection device 100d can be improved.

Based on the above, the embodiment of the invention has at least one of the following advantages or effects. In the design of the projection device of the invention, the rotating module is of an integrally design, so that when the rotating module rotates by taking an axis perpendicular to the mounting surface as an axial center, the rotating module can drive the imaging module assembled on the assembling part of the rotating module to rotate so as to change the projection direction of the imaging module. In other words, the user can change the projection direction of the imaging module by only rotating the rotating module by hand. In brief, the projection device of the invention can adjust the projection direction of the imaging module without using a tool, realizing better adjustment convenience. Furthermore, since the projection device of the invention adjusts the projection direction by hand, there is no need of using a tool or excessive indirect adjusting elements, it is not necessary to set a too large volume to contain the indirect adjusting elements, and then the volume is smaller. In addition, since the projection device of the invention does not require the use of the indirect adjusting elements, the elements are simple and easy to assemble and have the advantages in cost and use.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation as a number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising a rotating module and an imaging module, wherein
 the rotating module is assembled on a mounting surface and comprises a rotating part and an assembling part, the rotating part and the assembling part are integrally formed, the rotating part is parallel to the mounting surface, and the assembling part is perpendicular to the mounting surface; and
 the imaging module is assembled on the assembling part of the rotating module, and when the rotating module rotates by taking an axis perpendicular to the mounting surface as an axial center, the rotating module drives the imaging module to rotate so as to change a projection direction of the imaging module,
 wherein the imaging module comprises:
 a rotating sleeve, assembled on the assembling part of the rotating module and rotates with the rotation of the rotating module;
 a projection sleeve, slidably arranged in the rotating sleeve; and
 a projection assembly, locked in the projection sleeve, wherein the projection sleeve is adaptive to move relative to the rotating sleeve along a direction of an optical axis of the projection assembly so as to change a size of an image projected by the projection assembly.

2. The projection device of claim 1, wherein one of the rotating sleeve and the projection sleeve comprises at least one groove, the other one of the rotating sleeve and the projection sleeve comprises at least one bump, the at least one bump is slidably arranged in the at least one groove, and the projection sleeve moves relative to the rotating sleeve along the direction of the optical axis.

3. The projection device of claim 1, further comprising:
 a limiting element, wherein the rotating sleeve is provided with a through hole, the projection sleeve is provided with a positioning hole, and the limiting element penetrates through the through hole to be positioned in the positioning hole so as to position the projection sleeve and the rotating sleeve.

4. The projection device of claim 3, further comprising:
 an elastic pad, arranged between the rotating sleeve and the limiting element.

5. The projection device of claim 1, wherein the assembling part of the rotating module is provided with at least one assembling hole, the rotating sleeve comprises a cantilever, and the cantilever is pivoted to the at least one assembling hole to drive the imaging module to swing so as to change the projection direction of the imaging module.

6. The projection device of claim 5, further comprising: two locking elements, wherein the assembling part of the rotating module is provided with two assembling holes, the cantilever is positioned between the two assembling holes, and the two locking elements respectively penetrate through the two assembling holes to be adjustably locked on the cantilever.

7. The projection device of claim 6, further comprising: two elastic pads, respectively arranged between the two assembling holes and the two locking elements.

8. The projection device of claim 1, wherein the rotating sleeve further comprises a sleeve body and a plurality of heat dissipation fins, and the plurality of heat dissipation fins are dispersedly disposed on an outer surface of the sleeve body.

9. The projection device of claim 1, wherein the imaging module further comprises:
an adjusting ring, rotatably arranged on the projection assembly so as to change a projection focus of the projection assembly.

10. The projection device of claim 1, further comprising: an elastic baffle, disposed in the projection sleeve, wherein the projection assembly is positioned between the elastic baffle and a bottom surface of the projection sleeve, and a front end of the projection assembly penetrates through the elastic baffle to be exposed to the outside of the elastic baffle.

11. The projection device of claim 1, further comprising: a fixed seat, fixed on the mounting surface and is provided with an assembling opening, wherein the rotating part of the rotating module is positioned in the assembling opening, and when the rotating module rotates by taking the axis as an axial center, the rotating module rotates relative to the fixed seat.

12. A projection device, comprising a rotating module and an imaging module, wherein
the rotating module is assembled on a mounting surface and comprises a rotating part and an assembling part, the rotating part and the assembling part are integrally formed, the rotating part is parallel to the mounting surface, and the assembling part is perpendicular to the mounting surface; and
the imaging module is assembled on the assembling part of the rotating module, and when the rotating module rotates by taking an axis perpendicular to the mounting surface as an axial center, the rotating module drives the imaging module to rotate so as to change a projection direction of the imaging module,
the projection device further comprising:
a fixed seat, fixed on the mounting surface and is provided with an assembling opening, wherein the rotating part of the rotating module is positioned in the assembling opening, and when the rotating module rotates by taking the axis as an axial center, the rotating module rotates relative to the fixed seat; and
a fixing element, penetrating through the fixed seat to be adjustably locked on the rotating part of the rotating module so as to fix the fixed seat and the rotating module.

13. A projection device, comprising a rotating module and an imaging module, wherein
the rotating module is assembled on a mounting surface and comprises a rotating part and an assembling part, the rotating part and the assembling part are integrally formed, the rotating part is parallel to the mounting surface, and the assembling part is perpendicular to the mounting surface; and
the imaging module is assembled on the assembling part of the rotating module, and when the rotating module rotates by taking an axis perpendicular to the mounting surface as an axial center, the rotating module drives the imaging module to rotate so as to change a projection direction of the imaging module,
the projection device further comprising:
a containing shell, wherein the rotating module and the imaging module are positioned in the containing shell; and
an elastic element, connected to the containing shell and an inner wall of a ceiling.

14. The projection device of claim 13, wherein the imaging module comprises:
a projection assembly; and
a fastening part, connected to the projection assembly and provided with at least one fastening hole, wherein at least one opening of the containing shell exposes a portion of the fastening part.

15. The projection device of claim 14, wherein the imaging module further comprises:
an adjusting ring, rotatably arranged on the projection assembly so as to change a projection focus of the projection assembly.

16. The projection device of claim 14, further comprising:
a first elastic baffle, disposed in the containing shell and positioned between the fastening part and the projection assembly; and
a second elastic baffle, disposed in the containing shell, wherein the projection assembly is positioned between the first elastic baffle and the second elastic baffle, and a front end of the projection assembly penetrates through the second elastic baffle to be exposed to the outside of the second elastic baffle.

17. The projection device of claim 14, wherein the assembling part of the rotating module is provided with at least one slide groove, the at least one slide groove extends along a direction perpendicular to the mounting surface, the fastening part is slidably arranged in the at least one slide groove, and the fastening part moves relative to the rotating part of the rotating module so as to change a size of an image projected by the projection assembly.

18. The projection device of claim 17, wherein the fastening part is further pivoted to the at least one slide groove, and the fastening part drives the imaging module to swing so as to change the projection direction of the imaging module.

19. The projection device of claim 17, further comprising: two fastening elements, wherein the assembling part of the rotating module is provided with two slide grooves, the fastening part is provided with two fastening holes, the fastening part is positioned between the two slide grooves, the two fastening elements respectively penetrate through the two slide grooves to be positioned in the two fastening holes, and the two fastening elements drive the fastening part to move relative to the rotating part of the rotating module so as to change a size of an image projected by the projection assembly.

20. The projection device of claim 19, wherein when the two fastening elements respectively penetrate through the two slide grooves to be locked in the two fastening holes, the fastening part is limited to move relative to the rotating part of the rotating module.

21. The projection device of claim 19, further comprising:
two elastic pads, respectively arranged between the two slide grooves and the two fastening elements.

22. The projection device of claim 13, wherein the containing shell comprises a body and a plurality of heat dissipation fins, and the plurality of heat dissipation fins are dispersedly disposed on an outer surface of the body.

\* \* \* \* \*